May 5, 1970   N. J. QUARVE   3,510,384
FILM SPLICING APPARATUS
Filed Oct. 31, 1966   5 Sheets-Sheet 1
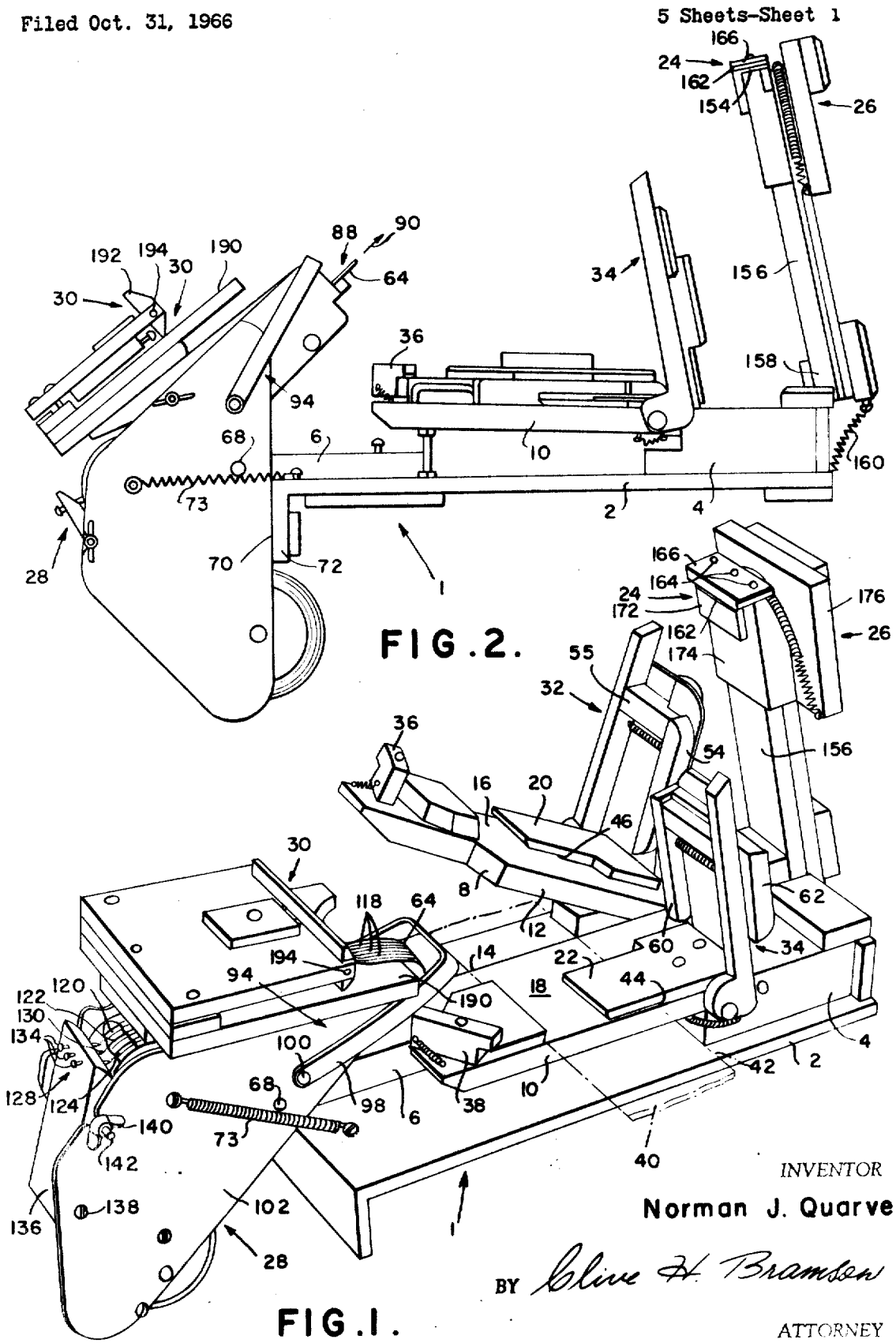
INVENTOR
Norman J. Quarve
BY Clive H. Bramsen
ATTORNEY May 5, 1970  N. J. QUARVE  3,510,384
FILM SPLICING APPARATUS Filed Oct. 31, 1966  5 Sheets-Sheet 2

INVENTOR
Norman J. Quarve

BY *Cline H. Bramson*

ATTORNEY

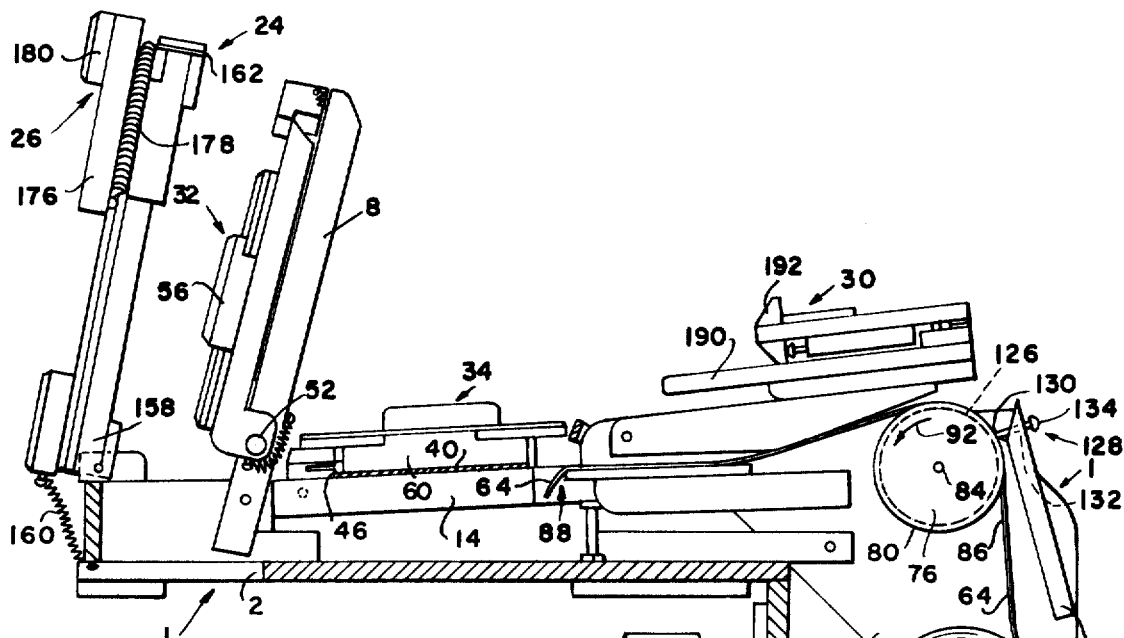
FIG. 6.
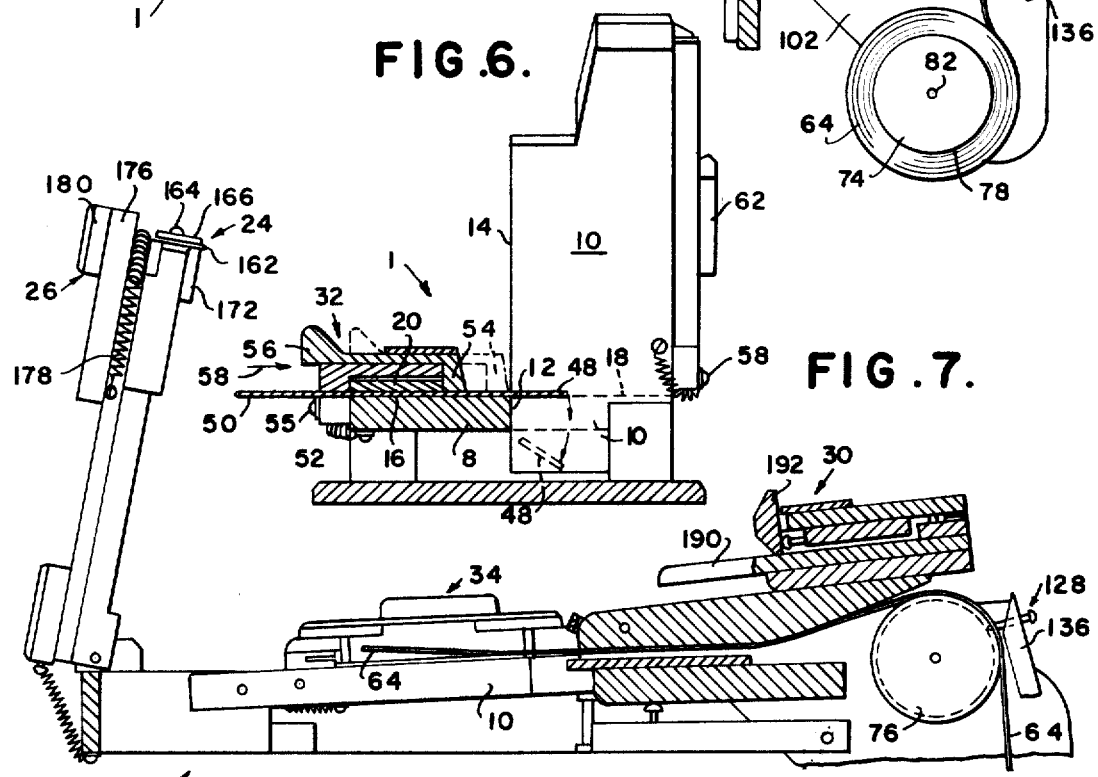
FIG. 7.
FIG. 8.
INVENTOR
Norman J. Quarve
BY *Clive H. Bramson*
ATTORNEY

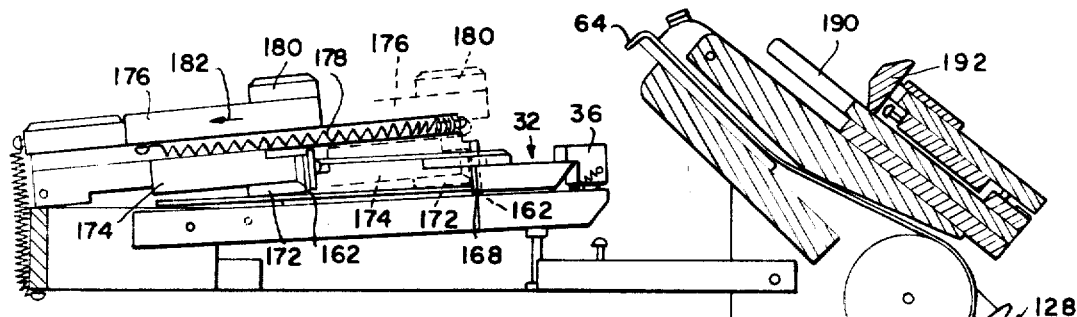
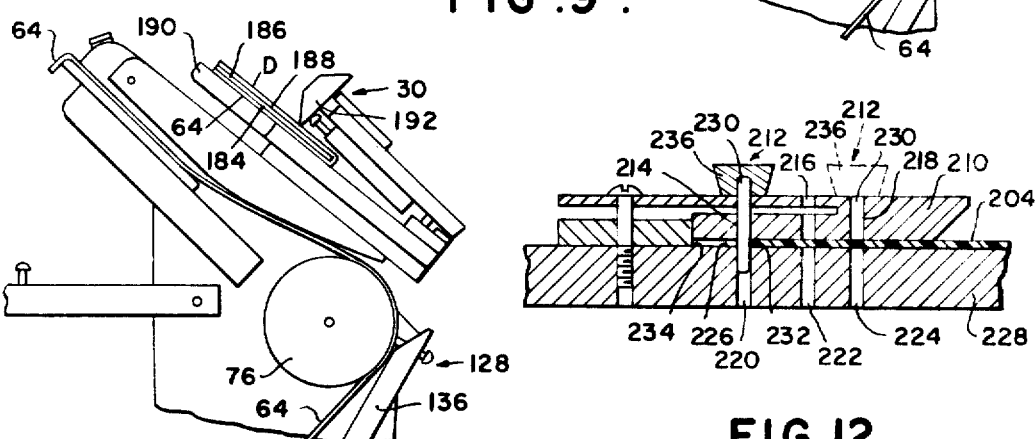
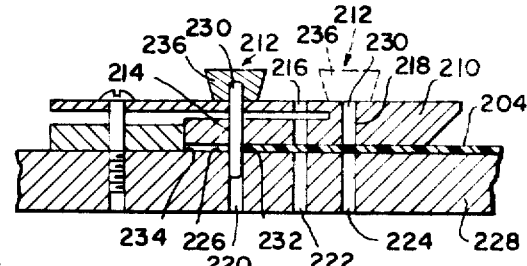
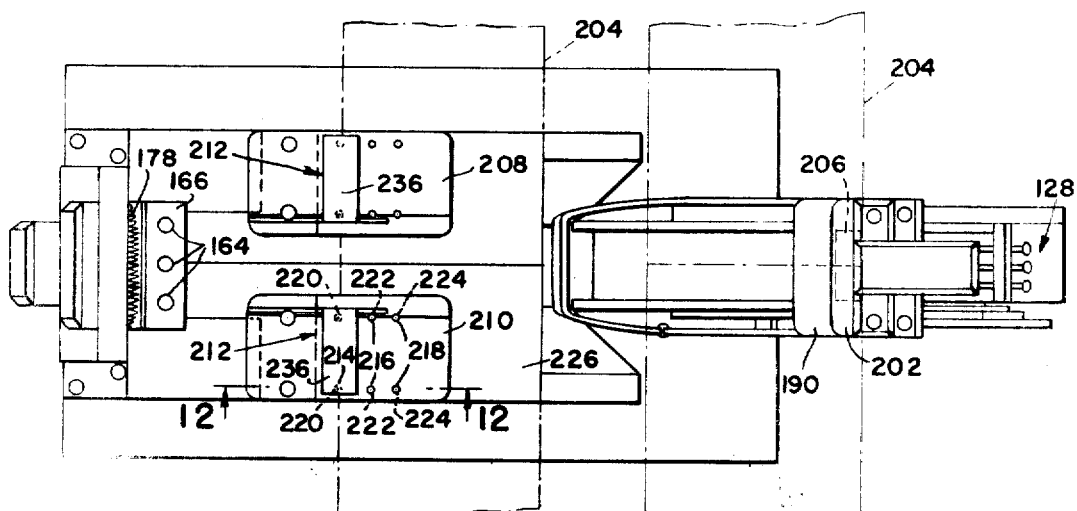

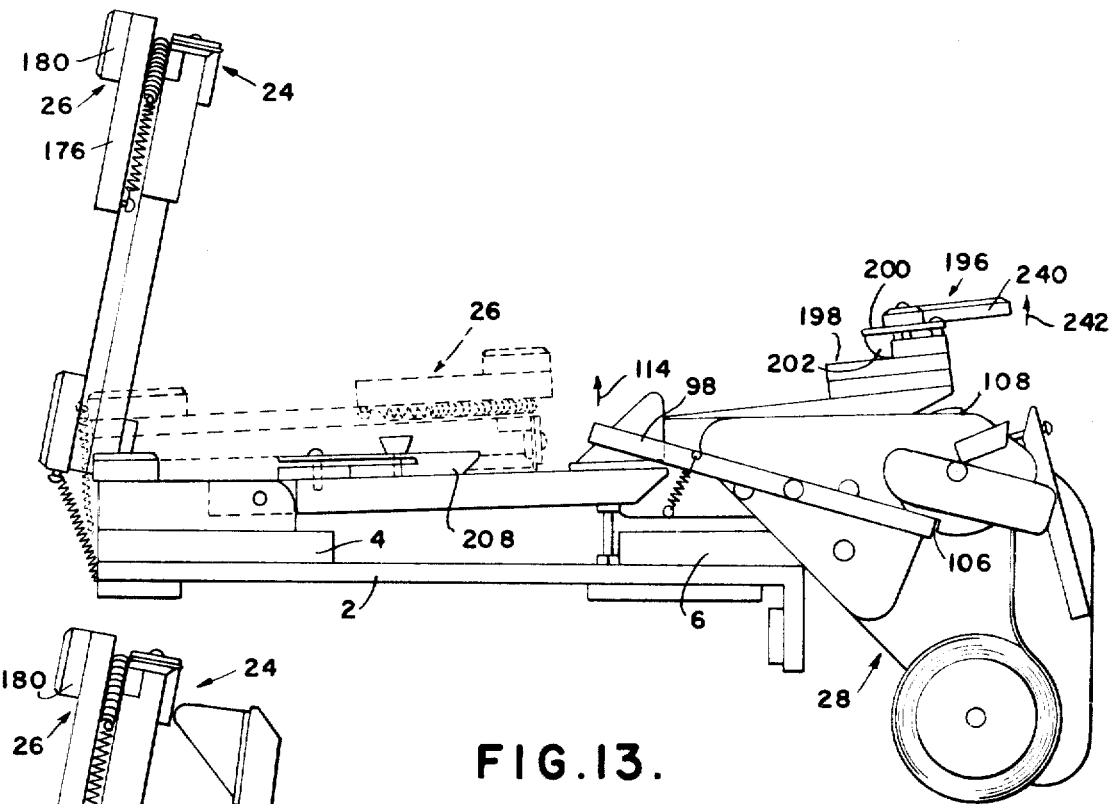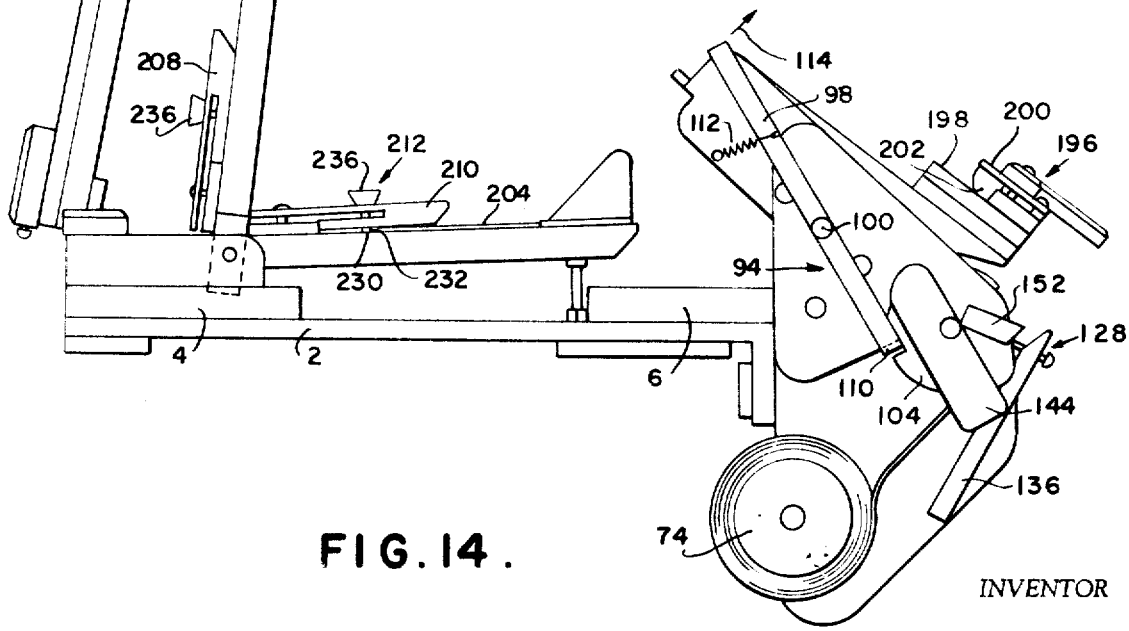

United States Patent Office 3,510,384
Patented May 5, 1970

3,510,384
FILM SPLICING APPARATUS
Norman J. Quarve, 3066 S. Buchanon St.,
Arlington, Va. 22206
Filed Oct. 31, 1966, Ser. No. 590,820
Int. Cl. B31f 5/06
U.S. Cl. 156—505        19 Claims

ABSTRACT OF THE DISCLOSURE

A film splicing device for applying an adhesive tape-type splice to sections of film to be joined wherein the film shearing and splicing tape dispensing means are relatively positioned so that the former provides a table surface on which film sections are retained and positioned after their transverse abutting edges have been trimmed and a predetermined length of tape withdrawn from the latter and deposited longitudinally of the abutting edges.

---

This invention relates generally to film splicing devices and more particularly to an improved apparatus especially capable of permitting the application of an adhesive tape-type splice to sections of film to be joined whereby the entire splicing operation can be accomplished in exceptionally short time to thereby render the present apparatus significantly more advantageous than heretofore known splicing devices.

Specifically, the present apparatus is readily adapted to the end of splicing motion picture film, magnetic tape and the like without regard to the presence or not of sprocket perforations. That is, in lieu of the locating pins utilized on the splicing device described in my U.S. Pat. No. 3,233,489, I herein disclose the use of simplified film-stop means for locating and aligning the film sections to be spliced, such means being exceptionally functional in rapidly enabling such alignment notwithstanding the inadequacy of the prevalent lighting conditions.

Further, the novel arrangement concerning the provision of and manner in which the splicing tape is dispersed, metered and applied to the abutting film sections and the unique structural nature and disposition of the splicing tape cutting means as combined herein, cooperatively function to permit accomplishment of the splice in minimum time, said splice being of exceptional strength and quality.

Accordingly, and consonant with the foregoing, the instant invention has for an object the provision of a film splicing apparatus wherein the film shearing and splicing tape dispensing means are relatively positioned whereby the former provides a table surface upon which film sections are retained and positioned after their transverse abutting edges have been trimmed and a predetermined length of tape may be withdrawn from the latter and deposited longitudinally of said abutting edges, the requirement of manual dexterity or skill in performing the foregoing operation having been substantially eliminated.

Another object of the present invention is to provide a device of the foregoing character including means for cutting the predetermined length of tape after the latter has been deposited upon the abutting sections of film posioned upon the table surface.

A further object of this invention resides in the provision of a film splicing apparatus including wipe-down means combined therewith and uniquely capable of applying pressure over the tape deposited transversely of the film and longitudinally of the abutting edges thereof, said pressure being applied in a single linear movement of said wipe-down means and immediately following the tape cutting operation.

Another object of the present invention is to provide a device in accordance with the foregoing which includes means for rigidizing the splicing tape as it is being withdrawn over the table surface to thus preclude curling which is otherwise commonly experienced in the handling of tape during splicing procedures.

Still another object of the instant invention is to provide a film splicing apparatus having means associated therewith for effectuating positive contiguity between a film section and a film shearing element adjacently of and in alignment with the cutting edge of said film shearing element.

A further object of the invention resides in the provision of a film splicing apparatus including adjustment means whereby the prepositioning of a film section upon a film shearing element may be varied and whereby the film size to be accommodated thereon may also, therefore, be varied.

Another object of the present invention resides in the provision of a film splicing apparatus having means for facilitating the preparation of a double splice whereby splicing tape can be readily applied and compressed against both the obverse and reverse sides of the abutting edges of the spliced film Another general object of the present invention is to provide a device of the described character which will be simple in structure, economical of manufacture, usable under poorly illuminated conditions and by unskilled hands, and highly effective with respect to the strength and quality of the splices produced thereby.

Other objects and advantages of the instant film splicing apparatus will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate embodiments of the invention, and together with the description, serve to explain the principles of the invention.

FIG. 1 is a perspective view of an embodiment of the film splicing apparatus, a film section and film shearing element being illustrated in shearing position and the splicing tape being partially broken away over the tape metering roll to show the grooved surface of said roll;

FIG. 2 is a side elevational view of the embodiment shown in FIG. 1, the tape dispensing means being pivoted to facilitate access to and grasping of the free end of the splicing tape;

FIG. 6 is a partial cross-sectional elevational view of the film splicing apparatus illustrating, inter alia, the cutting edge of a film shearing element and the movement of the splicing tape from the feed roll and across the arcuate surface of the tape metering roll;

FIG. 7 is a cross-sectional elevational view illustrating the film shearing function of the film shearing elements and the provision of the flat table surface formed by the combined upper flat surfaces thereof;

FIG. 8 is a cross-sectional side elevational view of the apparatus showing in detail the path of movement of the splicing tape to a position over the film shearing elements, and of the splicing tape fold-over means;

FIG. 9 is a partial cross-sectional side elevational view of the film splicing apparatus illustrating the movable nature of the wipe-down means for compressing the superposed tape against the abutting film sections;

3

Figure 3:
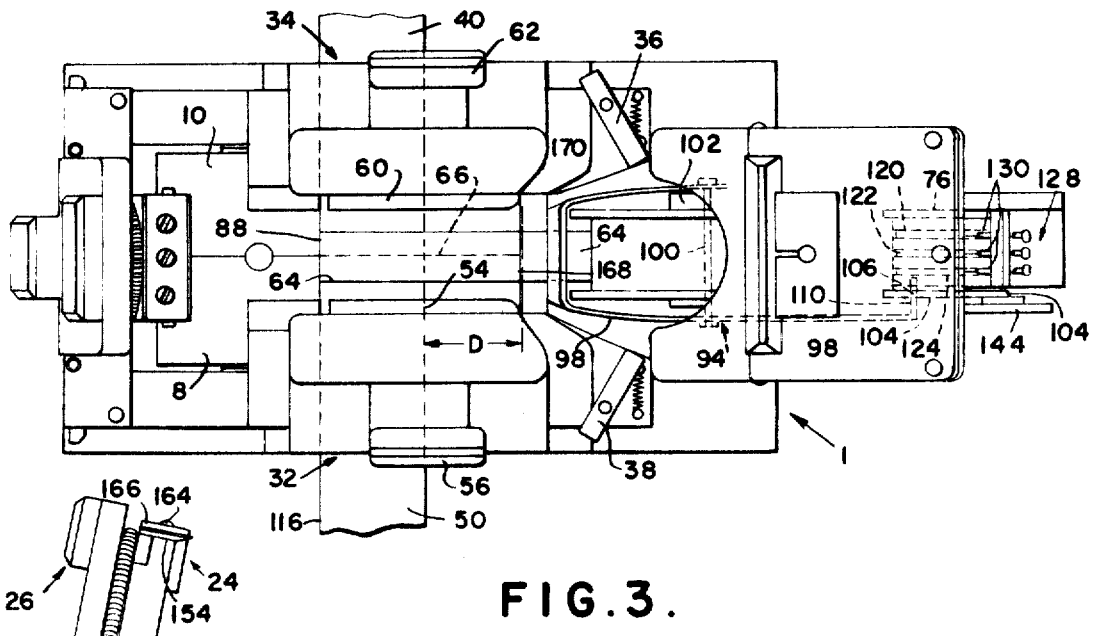
FIG. 3 is a plan view of the apparatus.

FIG. 10 is a fragmentary side elevational view of the apparatus illustrating the compressive action and fold-over function of the fold-over means mounted upon the tape dispenser means;

FIG. 11 is a plan view of a modified film splicing apparatus wherein the film-stop members include adjustment means for predeterminably varying the distance which the film is receivable between the film-stop member and the upper surface of a film shearing element, such adjustment rendering said apparatus capable of accommodating various film sizes;

FIG. 12 is an enlarged, fragmentary, cross-sectional view of the adjustment means associated with the modified film-stop member;

FIG. 13 is a side elevational view of the modified film splicing apparatus further disclosing a modified fold-over means; and FIG. 14 is a side elevational view of the apparatus shown in FIG. 13, the film shearing elements thereof being in operative shearing position and the tape dispensing means being pivoted whereby the free end of the splicing tape is readily accessible.

Referring now in detail to the invention illustrated in the accompanying drawings, one embodiment thereof is designated generally by numeral 1 in the various positions as heretofore described.

Generally, the film splicing apparatus is comprised of a major support or body portion 2 which includes upright supporting structure 4 and 6 at the rearward and forward ends thereof, respectively, a pair of film shearing elements 8 and 10, each having cutting edges 12 and 14, respectively, and flat upper surfaces 16 and 18, respectively, a pair of cantilevered film-stop or friction guide members 20 and 22, each of the latter being mounted upon the upper surface of a respective film shearing element, splicing tape cutting means designated generally by numeral 24, tape wipe-down means designated generally by numeral 26, splicing tape dispensing means designated by numeral 28, and splicing tape fold-over means designated generally by numeral 30. Other elements of the instant combination which cooperatively coact to enable and facilitate the rapid splicing of abutting film sections include hold-down means individually and generally designated by numerals 32 and 34, and retention means 36 and 38, which respectively function to removably secure said hold-down means and film shearing elements in parallelism as shown, for example, in FIG. 4 of the drawings.

More specifically, and with reference again to FIG. 1, a section of film 40 will be seen received beneath cantilevered friction film-guide member 22 whereby the longitudinal edge 42 of the film section is caused to abut shoulder 44 thereby establishing the distance the film can be inserted beneath said film-stop member in the direction of the rearward end of the film splicing apparatus. Shoulder 46 of film-stop member 20 similarly functions to restrict movement of film therebeneath, serves to pre-position said film section and establishes alignment of the longitudinal edges of respective sections of film to be spliced. As illustrated in FIG. 7, film shearing element 10 will be seen positioned prior to and subsequent to shearing a portion 48 from film section 50, the latter being frictionally secured between film-stop member 20 and flat upper surface 16 of film shearing element 8 by dint of the yielding or flexible nature of said element 20 with respect to the surface 16 of said element 8.

Figure 4:
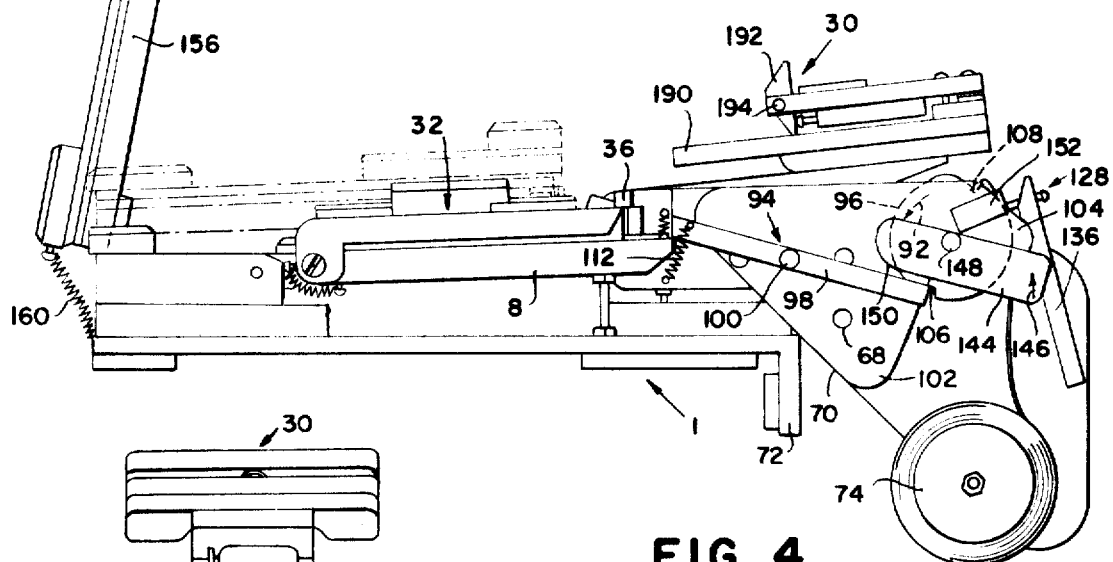
FIG. 4 is a side elevational view thereof illustrating the operative position of the tape cutting and wipe-down means in broken line designation.
Figure 5:
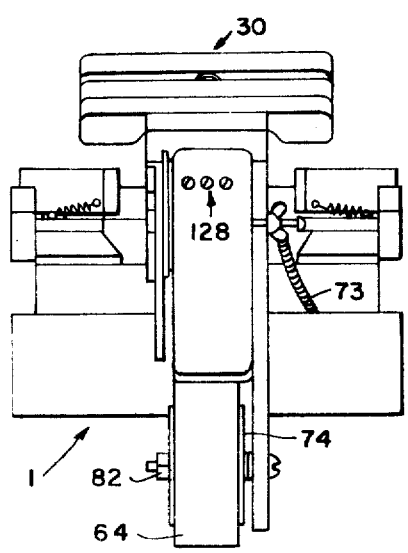
FIG. 5 is an end elevational view of the foregoing apparatus taken at the forward end thereof.

To facilitate the shearing operation, aforesaid hold-down means 32 which is pivotally secured by pin 52 to film shearing element 8 is pivoted downwardly against said element 8 and into parallelism with respect to upper surface 16 thereof as shown in FIG. 7, spring biased retention means 36 being engageable with said hold-down means as shown, e.g., in FIG. 4, to thereby secure and retain said parallel arrangement. As shown in FIG. 7, said hold-down means 32 includes slide-bar 54, the latter being slidingly secured to the body 55 of said hold-down means and movable, when urged by a force applied in the direction of arrow 58 against handle 56. When so urged, the slide-bar will move over the film 50 lying superposed with respect to flat upper surface 16 of said film shearing element, to an extended position, shown in broken line designation, which is in substantial alignment with the cutting edge 12 of said film shearing element, said slide-bar being further movable to the solid line retracted position disposed adjacently of film-stop member 20. Hold-down means 34, associated with film shearing element 10, is constructed as and operates in the manner of means 32. It is, as shown, pivoted to element 10 at pin 58, includes slide-bar 60, handle 62 and is removably securable to retention means 38 illustrated in the drawings. Film-stop member 22 is, as member 20, similarly yieldingly biased toward flat surface 18 of film shearing element 10 and serves to secure and position a section of film to be spliced in the manner heretofore described, whereafter the free transverse end of said film section can be sheared by the downward action of film shearing element 8. Thus, as observed in the drawings, the cutting edges 12 and 14 of film shearing elements 8 and 10, respectively, are movable into longitudinal edge-abutting cutting relation whereby film held beneath either of said film-stop members can be sheared transversely using the downward motion of one film shearing element against the other. As aforedescribed with reference to FIG. 7, the upper surfaces 16 and 18 of said film shearing elements cooperatively form a flat table surface for supporting the sheared, abutting film sections to be spliced.

To the ends of facilitating the placement of and metering of the required length of splicing tape 64 over the abutting transverse ends 66 of film sections 40 and 50 as shown in FIG. 3 of the drawings, splicing tape dispenser means 28 is provided at the forward end of said body portion 2 and pivotally connected at 68 to supporting structure 6 thereof. The pivotal arrangement of said tape dispenser will be seen by comparative reference, e.g., to FIGS. 2 and 4, the former figure illustrating said dispenser in the back-swung relation wherein edge 70 thereof abuts vertical portion 72 of said body portion, and the latter figure showing said dispenser in the forward-swung position wherein edge 70 is spaced from vertical portion 72 to form an approximate 45° angle therebetween. It will be appreciated that when in the FIG. 2 position, splicing tape 64 is readily accessible and convenient to grasp between two fingers of the user. Tensioning spring 73 as shown, functions to retain said tape dispenser means in either of the above-placed positions.

With reference now to FIG. 6 of the drawings, it will be seen that said dispenser means includes tape feed roll 14 and tape metering roll 76, each of said rolls having an arcuate surface, 78 and 80, respectively, and rotational axes 82 and 84, said axes being disposed in mutually spaced parallel relation and perpendicularly arranged with respect to said cutting edges 12 and 14 of said film shearing elements.

The splicing tape utilized herein may be of any suitable type and may be transparent, translucent or opaque depending upon the nature of the splice to be made, and the nature of the film, magnetic tape, etc., to be spliced. The adhesive surface 86 of the tape is arranged to frictionally move over the arcuate surface 80 of said tape metering roll 76 as the tape is being withdrawn from feed roll 74. That is, when the free end 88 of tape 64 is pulled in the direction of arrow 90, said metering roll will rotate in the direction of arrow 92 in response to the movement of said tape by dint of the continuing frictional engagement of said tape with respect to the arcuate surface of said metering roll, whereby the latter is driven by such frictional engagement.

The length of tape permitted to be removed in a single continuous withdrawal action is governed by the coaction of clutch means 94 and catch means 96. With reference to FIGS. 1, 3 and 4, said clutch means will be seen to comprise a generally U-shaped lever member 98 pivotally secured at pin 100 to frame 102 of said tape dispenser means. Tape dispenser roll 76 is provided with a disc-shaped side member 104 which includes notches 106 and 108 provided peripherally thereof, inwardly bent end portion 110 of said lever member 98 being removably receivable within either of said notches 106 and 108 depending upon the rotated position of said tape metering roll. Thus, bent end portion 110 of said lever member which is normally biased against said side member 104 by reason of tension spring 112 continually rides thereagainst unless held away by a lifting force exerted upon lever 98 in the direction of arrow 114. Accordingly, once tape metering roll 76 has been rotated whereby said end portion 110 engages either of notches 106 or 108, further rotation of said metering roll will be precluded and further removal, therefore, of tape from feed roll 74 will also be precluded inasmuch as that portion of tape 64 which is contacting the arcuate surface of the metering roll is adhering thereto, thus preventing the by-passing of said metering roll. It will be appreciated, therefore, that the length of tape removed as a result of each withdrawal operation will be of predetermined length, that is, the arcuate surface distance between notches 106 and 108. In view of the foregoing, the length of tape withdrawn for a splicing operation will be metered, and is preferably arranged in order that the free end 88 of the tape will, when withdrawn the distance between notches 106 and 108, extend to the longitudinal edge 116 of the abutting film sections as illustrated in FIG. 3 of the drawings.

As earlier mentioned herein, it has been found that the obviation of the tendency of the splicing tape to curl upon removal thereof from the feed and metering rolls is an important desideratum of the present invention, especially when the required film splicing operation is to be carried out under poorly lighted conditions rendering close visual observation of the tape and apparatus difficult. To the end of imparting rigidity to the tape even where a considerable length of the latter is dangling freely, flutes or indents 118 are created longitudinally of the tape, such fluted condition being effectuated as the tape moves frictionally and drivingly over and with respect to the tape metering roll 76.

With specific reference, therefore, to FIGS. 1, 3 and 6 of the drawings, it will be seen that said tape metering roll 76 is provided with three circumferential grooves 120, 122 and 124, the deepest regions of said grooves being characterized by numeral 126. Indent-forming means 128 which comprise, as illustrated, three machine-screw type members, each having a pointed end 130, a threaded shaft portion 132 and a kerfed head portion 134, are threadedly mounted upon bracket 136, the latter being pivotally secured to frame 102 of said dispenser means 28 by pin 138. Wing-nut 140 being threaded to stud 142 which extends laterally of bracket 136 permits tightening of the latter with respect to said frame 102 to thus preclude movement of said bracket. Such pivotal arrangement of bracket 136 facilitates "threading" of the tape within the tape dispenser. As shown in FIG. 6, pointed ends 130 of said indent-forming means partially extend into the circumferential grooves provided within the arcuate surface of the metering roll and spacedly with respect to the deepest regions 126 thereof, tape 64, when "threaded" as shown, being depressed by said pointed portions. Accordingly, as the splicing tape is drawn between said grooves and said pointed portions, said tape will be longitudinally fluted as indicated by numeral 118 and thus rigidized in the longitudinal direction.

Where it is desired to continually withdraw unmetered lengths of splicing tape from said feed roll 74, clutch means 94 can be temporarily disengaged from disc 104 and beyond interception of notches 106 and 108 thereof by lifting lever 144 by application of force in the direction of arrow 146, said lever being pivotable at screw-pin 148 whereupon edge 150 of lever 144 will act upon lever arm 98 to depress the latter to accomplish such disengagement. Inasmuch as lever 144 is tightly although movably secured by screw-pin 148 against the flat surface of disc 104, said lever 144 will remain stationary in any position to which it is moved, the force of spring 112 being overcome thereby. Stop member 152 establishes the degree of movement required of lever 144 to completely disengage clutch means 94.

Splicing tape cutting means 24, aforementioned and illustrated clearly in FIGS. 1, 2 and 4, e.g., is shown secured at free end 154 of support arm 156, the other end 158 of said support arm being pivotally connected above upright supporting structure 4 at the rearward end of body portion 2 of the instant apparatus. Tension spring 160 serves to normally retain said support arm in the "up" position shown in FIG. 2, e.g., and thereby away from said shearing elements 8 and 10 during the film shearing and splicing-tape-applying operations. Said cutting means more particularly comprises a cutting blade 162 secured to said support arm by machine screws 164, the latter being adapted to tighten said blade between endplate 166 and end 154 of said support arm. Thus, by swinging said support arm completely toward said film shearing elements 8 and 10 at such time that the latter combinedly form the aforedescribed flat table surface, said blade 162 will cut the slicing tape 64 along line 168 shown in FIGS. 3 and 9 of the drawings. The cut will be effected just beyond, adjacently and parallel with respect to the forward edge 170 of said flat table surface.

Subsequent to the effectuation of the aforedescribed splicing tape severing operation, the present apparatus further includes means for applying a movable compressive force against the abutting film sections and the metered and severed length of splicing tape lying longitudinally superposed with respect to the abutting edges of said abutting film sections. To the ends of rapidly and advantageously permitting the application of such a moving compressive force, wipe-down means 26 is, as shown in the drawings, slidably mounted upon said support arm 156. With specific reference now to FIGS. 1 and 9, said wipe-down means will be seen to include a pressure-pad 172 rigidly secured to a slide-plate 174, the latter being attached to retaining-plate 176, said support arm 156 being disposed between plates 174 and 176 whereby the latter can, in unison, be slid forward and backward upon said support arm as shown in FIG. 9, said pressure-pad 172, which depends rigidly from said slide-plate being therefore manually movable against said partially combined tape and abutting film sections to complete and enforce the adhesion therebetween. Spring 178 is provided as shown, to normally bias said wipe-down means toward end 154 of said support arm, the user, by grasping handle 180 and urging the latter in the direction of arrow 182, being capable of overcoming the tension of said spring to thereby move said pressure bar in the direction of end 158 of said support arm.

At this stage of the splicing operation, tape is securely adhered to the obverse side 184 of joined film 186 as seen in FIG. 10 of the drawings. The remaining length of tape designated by letter D in FIGS. 3 and 10 remains to be secured to the reverse side 188 of film 186. Splicing tape fold-over means designated generally by numeral 30 is provided to facilitate and assure adherence of said tape length D to the reverse side of said film. Specifically, said fold-over means is comprised of platform member 190 and pressure-bar member 192, the latter being disposed above the former and horizontally pivotable at pin 194 to permit insertion of both film and adhering splicing tape therebetween as shown in FIG. 10 of the drawings. That is, by dint of this pivotable arrangement, the abutting film sections and splicing tape can be slid between said pressure-bar and platform members whereby length D of the tape will automatically be caused to fold-over the reverse side of the film and adhere thereto by reason of the pressure applied to the film and tape as the sliding maneuver is accomplished.

At this point the splice has been completed and the united film, magnetic tape or the like is removed from the apparatus.

With reference now to FIGS. 11–14, modified embodiments of the above film-stop members and fold-over means are illustrated, reference numerals utilized in said figures being the same as used heretofore when describing like parts with respect to the first described embodiment.

The modified splicing tape fold-over means illustrated in FIGS. 13 and 14 is designated generally by numeral 196 and includes platform member 198 and pressure-bar member 200, the latter including a felt pad 202 depending integrally therefrom, said pressure-bar being therefore yieldable and capable of receiving a length of spliced film 204 where only a small remaining length of metered tape 206 need be folded over to unite with the reverse side of said film 204. The film and still non-adhering tape is slid between pad 202 and platform 190 whereupon the adhesion of tape and film is readily completed. It will be appreciated that yieldable pad materials other than felt are within the contemplation of this invention, rubber, e.g., being also suitably utilizable.

Another modification disclosed in FIGS. 11–14 of the drawings relates to film-stop members 208 and 210 and more particularly to adjustment means 212 associated therewith, said adjustment means being adapted to permit selective variation of the distance of which a film section to be spliced is inwardly slidable and receivable between said film-stop members and the upper surface of respective film shearing elements. As shown in detail in the cross-sectional view of FIG. 12, said adjustment means comprises first pairs of apertures 214, 214, 216, 216, and 218, 218, disposed through said film-stop member 210 as shown, second pairs of apertures 220, 220, 222, 222, and 224, 224, provided within the surface 226 of film shearing element 228, said first and second respective pairs of apertures being in aligned registry, and dowel or pin members 230 removably receivable and selectively positionable into said first and second aligned pairs of apertures to thereby restrict movement of film beneath said film-stop members. Thus, as shown in FIG. 12, film 204 is received between the film-stop member 210 and surface 226 of film shearing element 228, longitudinal edge 232 of said film being restrained against further inward movement toward shoulder 234 by reason of the obstructing presence of pins 230 positioned within apertures 214, 214 and 220, 220. Repositioning of said pin members readily permits adjustment of the apparatus with respect to the accommodation of various film sizes, e.g., 35 mm., 70 mm., 160 mm., etc. Handle members 236 facilitate removal and placement of said pin members and enables such removal and placement thereof by pairs.

Mode of operation

The functions of the respective elements of the present invention will be understandable from the description already given. The operation of the apparatus will, however, at this time be specifically described with respect to uniting or splicing film sections 40 and 50.

As will be observed in FIG. 1 of the drawings, film section 40 has been slipped beneath film-stop member 22 whereby the edge 42 thereof abuts against shoulder 44 of said member. Hold-down means 34 is secured to retention means 38 whereby said means 34 assumes a parallel attitude with respect to surface 18 of film shearing element 10. Slide-bar 60 is then moved into adjacency with respect to cutting edge 14 and film shearing element 8 is swung downwardly to thereby shear that portion of film section 40 extending over cutting edge 14. The same procedure is carried out with respect to film section 50 which is slipped, as aforedescribed, beneath film-stop member 20 of film shearing element 8 as shown in FIG. 7 of the drawings. With further reference to said figure, it will be seen that film section portion 48 has been sheared from film section 50 whereby the respective sheared edges of film sections 40 and 50 are arranged in edge-abutting relation along line 66 as shown in FIG. 3 of the drawings. With slide-bars 54 and 60 retracted into inoperative position, a metered length of splicing tape 64 is withdrawn from the tape dispensing means and caused to superpose and adhere to said abutting film sections, whereafter cutting means 24 is swung downwardly toward and against said film shearing elements as the latter are arranged in the horizontal cutting-edge abutting and flat table surface forming position. Cutting blade 162 thus severs the splicing tape along line 168 thereby leaving an extending length of tape D integral with the portion of the severed tape now adhering to the film sections and uniting the latter as described. Wipe-down means 26 is then moved across the entire length of severed tape as shown in FIG. 9 to more positively effectuate adherence of the tape with respect to the obverse side 184 of the abutting and now united film sections.

To the end of securing the remaining severed tape length D to the reverse side 188 of the abutting film identified in FIG. 10 by numeral 186, the film is slipped beneath pressure-bar 192 of fold-over means 30 with said reverse side facing upwardly of platform 190 as shown. As the tape and film combination is slipped beneath said pressure-bar, length D of tape 64 will be compressed against said reverse side 188 to effectuate positive adhesion therebetween. Where fold-over means 196 is utilized, e.g., when the tape length D is very short and therefore meant to extend only partially over the reverse side of the film, lifting of lever 240 in the direction of arrow 242 serves to more positively compress yieldable member 202 against the tape and film slipped between platform 198 and member 202.

The splicing tape utilizable herein may consist of any strong material such as Mylar and may be of any suitable width.

Thus, a method of splicing film or the like and a novel apparatus for effectuating said method has been disclosed. Inasmuch as changes may be made in carrying out the above method and apparatus without departing from the scope of the invention, it is intended that all matter contained in the above description shall be interpreted as illustrative and exemplary and not in a limiting sense.

What is claimed is:

1. A film splicing apparatus comprising in combination, a body portion having forward and rearward ends, a pair of film shearing elements each having cutting edges and flat upper surfaces, means to slidably and removably receive film sections to be spliced along the upper surfaces of said film shearing elements including a pair of friction film-guide members each being mounted upon the upper surface of a respective film shearing element, said film shearing elements being independently pivotably mounted upon said body portion, said respective cutting edges thereof being movable into longitudinal edge-abutting relation, said upper surfaces of said shearing elements being adapted to cooperatively form a flat table surface for supporting abutting film sections to be spliced.

2. A film splicing apparatus as set forth in claim 1 wherein each of said friction film-guide members is cantilevered to a respective shearing element and includes means for positioning said film shearing elements, said fraction film-guide members being flexible along their lengths.

3. A film splicing apparatus as set forth in claim 1 including splicing tape cutting means, said cutting means being pivotably connected to said body portion and swingable toward and away from said shearing elements, said cutting means being movable into transverse relation with respect to the abutting cutting edges of said film shearing elements when the latter cooperatively form said flat table surface.

4. A film splicing apparatus as set forth in claim 3 wherein said tape cutting means is secured to a support arm, said arm being pivotally connected at one end to said body portion, the other end thereof being free, wipe-down means slidably mounted on said arm, said wipe-down means including a pressure-pad depending rigidly therefrom, said wipe-down means being manually movable along said support arm whereby said pressure-pad is capable of movement across said flat table surface above the region of the cutting edges thereof and longitudinally with respect thereto when the latter are disposed in said edge-abutting relation.

5. A film splicing apparatus as set forth in claim 4 including bias means continually acting against said wipe-down means to yieldingly urge the latter toward one end of said support arm, said wipe-down means being adapted to return to said one end of said support arm subsequent to release of said wipe-down means after the latter has been manually moved away from said one end of said support arm.

6. A film splicing apparatus as set forth in claim 5 wherein said film cutting means and pressure-pad are normally disposed adjacently of one another.

7. A film splicing apparatus as set forth in claim 1 including splicing tape dispenser means connected to said body portion, said dispenser means including a tape feed roll and a tape metering roll, each of said rolls having an arcuate surface and rotational axes, said rotational axes being disposed in mutually spaced parallel relation and normally disposed with respect to said cutting edges of said shearing elements.

8. A film splicing apparatus as set forth in claim 7 wherein said splicing tape dispenser means is pivotally connected to the forward end of said body portion and wherein said film shearing elements are connected at the rearward end of said body portion.

9. A film splicing apparatus as set forth in claim 7 wherein said tape dispenser means includes clutch means movably attached thereto and arranged for removable engagement with respect to said tape metering roll, said clutch means being adapted to engage said tape metering roll to thereby preclude further rotation thereof subsequent to the removal of a predetermined length of splicing tape from said tape feed roll when said removal is accomplished by drawing said tape across said tape metering roll, the latter being adapted to rotate in response to the movement of said tape, the adhesive surface thereof when moving across said tape metering roll being capable of frictionally driving the latter.

10. A film splicing apparatus as set forth in claim 9 wherein said tape metering roll comprises catch means mounted thereon for rotation therewith, said clutch means normally biased toward said catch means and engageable therewith when said tape metering roll is rotated through a predetermined angular movement.

11. A film splicing apparatus as set forth in claim 10 wherein said catch means comprises a notch disposed in the periphery of said tape metering roll, and said clutch means comprises a pivotal lever having a notch engaging portion.

12. A film splicing apparatus as set forth in claim 7, said arcuate surface of said tape metering roll having a groove disposed circumferentially thereof, and indent-forming means mounted upon said tape dispenser means, said indent-forming means being in part disposed within said groove and spacedly with respect to the deepest region thereof, said splicing tape being movably receivable between said groove and said indent-forming means whereby the tape moved therebetween will be longitudinally fluted and rigidized in the longitudinal direction.

13. A film splicing apparatus as set forth in claim 7 including splicing tape fold-over means, said means comprising a platform member and a pressure-bar member, the latter being disposed above the former and movable with respect thereto, abutting film sections and splicing tape adhesively disposed transversely of said abutting sections being removably receivable between said platform and pressure bar members.

14. A film splicing apparatus as set forth in claim 13 wherein said pressure-bar member is yieldably supported above said platform member.

15. A film splicing apparatus as set forth in claim 1 including a pair of hold-down means each being pivotally secured to a respective film shearing element and arranged to swing from a position angular with respect to said film shearing element to a position in parallelism with respect thereto, each said hold-down means including a slide-bar, said slide-bar being parallel with respect to the cutting edge of a respective film shearing element when the latter and a respective hold-down means are disposed in parallelism, and retention means for removably securing said hold-down means and film shearing elements in parallelism.

16. A film splicing apparatus as set forth in claim 15 wherein said slide-bar is slidingly secured to said hold-down means, said slide-bar being movable over the flat upper surface of a respective film shearing element to an extended position substantially in alignment with the cutting edge of said respective film shearing element and to a retracted position adjacently of a respective friction film-guide member.

17. A film splicing apparatus as set forth in claim 16 including retraction means acting upon said slide-bar to normally urge the latter into adjacency with respect to said friction film-guide member.

18. A film splicing apparatus as set forth in claim 1 including adjustment means associated with said film-stop members, said adjustment means being adapted to permit selective variation of the distance of which film to be spliced is inwardly slidable and receivable between said film-stop members and upper surfaces of said film shearing elements.

19. A film splicing apparatus as set forth in claim 18 wherein said adjustment means comprises first apertures disposed through said friction film-guide members, second apertures provided in the upper surfaces of said film shearing elements, said first and second apertures being in aligned registry, and dowel members removably receivable and selectively positionable into said first and second apertures to thereby restrict movement of film beneath said friction film-guide members in the direction of the rearward end of said apparatus.

References Cited
UNITED STATES PATENTS

| | | | |
|---|---|---|---|
| 2,346,874 | 4/1944 | Russell | 156—505 |
| 2,539,611 | 1/1951 | Daniel et al. | 156—505 |
| 3,233,489 | 2/1966 | Quarve | 83—607 X |

ROBERT F. STAHL, Primary Examiner

U.S. Cl. X.R.

83—456